(12) United States Patent
Takahashi

(10) Patent No.: US 6,476,978 B2
(45) Date of Patent: Nov. 5, 2002

(54) LINEAR-MOTION HELICOID MECHANISM FOR CCTV CAMERA

(75) Inventor: Kazunori Takahashi, Tokyo (JP)

(73) Assignee: Asahi Seimitsu Kabushiki Kaisha, Tokyo (JP)

(*) Notice: Subject to any disclaimer, the term of this patent is extended or adjusted under 35 U.S.C. 154(b) by 0 days.

(21) Appl. No.: 09/861,570

(22) Filed: May 22, 2001

(65) Prior Publication Data

US 2002/0021904 A1 Feb. 21, 2002

(30) Foreign Application Priority Data

Aug. 17, 2000 (JP) ....................................... 2000-247399

(51) Int. Cl.[7] .............................. G02B 15/14; G02B 7/02
(52) U.S. Cl. ...................... 359/704; 359/694; 359/819; 359/822; 359/825; 359/827; 359/828
(58) Field of Search ................................ 359/694–706, 359/811, 819, 821, 826–830

(56) References Cited

U.S. PATENT DOCUMENTS

| | | | |
|---|---|---|---|
| 4,676,605 A | * 6/1987 | Toda et al. | 359/696 |
| 5,198,932 A | * 3/1993 | Takamura | 359/694 |
| 5,589,987 A | 12/1996 | Tanaka | 359/701 |
| 5,765,048 A | 6/1998 | Nomura et al. | 396/72 |
| 5,809,348 A | 9/1998 | Nomura et al. | 396/72 |
| 5,987,262 A | 11/1999 | Higuchi et al. | 396/144 |
| 6,055,116 A | * 4/2000 | Nomura et al. | 359/819 |

FOREIGN PATENT DOCUMENTS

| | | |
|---|---|---|
| DE | 39 39 399 A1 | 8/1990 |
| DE | 197 02 486 A1 | 7/1997 |
| JP | 10-68859 A | 3/1998 |
| JP | 10-68859 | 3/1998 |
| JP | 11-160605 A | 6/1999 |

OTHER PUBLICATIONS

Japanese Abstract No., 09–211297, dated Aug. 15, 1997.

* cited by examiner

Primary Examiner—Evelyn A Lester
(74) Attorney, Agent, or Firm—Sughrue Mion, PLLC

(57) ABSTRACT

A linear-motion helicoid mechanism for a CCTV camera, comprising a lens frame for holding lenses, a key member, a helicoid female member and a rotating frame that is formed integrally with the helicoid female member. The lens frame comprises a cylindrical lens holder having helicoids and keyways on an outer periphery of the cylinder. The key member comprises a cylindrical part having keys for engagement with the keyways provided on the key member. The helicoid female member comprises a cylindrical part having helicoids that engage with the helicoids of the helicoid female member. The rotating frame and the helicoid female member are engaged together with a bayonet mechanism, so that the rotating frame fixes a position of the helicoid female member to the key member in the optical axis direction and supports it rotatably about the optical axis.

4 Claims, 8 Drawing Sheets

PRIOR ART

LINEAR-MOTION HELICOID MECHANISM FOR CCTV CAMERA

BACKGROUND OF THE INVENTION

1. Field of the Invention

The present invention relates to a linear-motion helicoid mechanism applied to focusing system of a CCTV camera.

2. Description of the Related Art

Conventionally, a linear-motion helicoid mechanism is, for example, used for a focusing mechanism of a CCTV (closed circuit television) camera which may be utilized as a surveillance camera etc. A conventional linear-motion helicoid mechanism will be explained referring to FIG. 9. In a linear-motion helicoid mechanism, a lens group B can be made-to move back and forth in the direction of an optical axis PP without causing rotation of the lens frame 13 holding the lens group B. The outer peripheral surface of the cylindrically shaped lens holder 13B of the lens frame 13 is provided with a male helicoid 13A and female keyways 13b.

The female keyways 13b are for controlling the lens frame 13 movement translationally in the axial direction. The lens frame 13 is supported with a camera body (not shown), in a manner which enables it to move translationally in the direction of the optical axis PP, through a key member 15. The key member 15 is provided with keys 15a, each of which engages with each of the keyways 13b. Note that the key member 15 is fixed to a mount 16 by a mount spring (an annular spring plate) 17 and screws 18, so that the key member 15 is threadably supported by the camera body through the mount 16. The key member 15 is sandwiched between a helicoid female member 50, provided with a female helicoid 50a for engagement with the male helicoid 13a provided in the lens frame 13, and a focus ring 51. That is, the relative arrangement of the key member 15 and the helicoid female member 50 in the direction of the optical axis PP is fixed, and the distance of the helicoid female member 50 from the camera body is fixed. On the other hand, the helicoid female member 50 is able to rotate about the key member 15 concentric with the optical axis PP. The helicoid member 50 is fixed to the focus ring 51 by three screws 52 (only one shown). Namely, the helicoid member 50 can be rotated about the optical axis PP by the rotational operation of the focus ring 51. If the helicoid female member 50 is made to rotate by making the focus ring 51 rotate, the lens frame 13 is pushed out from the front to the rear or the rear to the front, by the helicoid mechanism. At this time, the lens frame 13 cannot rotate and can only move translationally along the optical axis PP as the key member 15 is fixed to the camera body.

SUMMARY OF THE INVENTION

An object of the present invention is to provide a simple and miniaturized linear-motion helicoid mechanism that may be used for a CCTV camera, at a low price.

According to the present invention, a linear-motion helicoid mechanism for a CCTV camera is provided with a lens frame, a key member, a helicoid female member, and a rotating frame that is formed integrally with the helicoid female member.

The lens frame is for holding lenses and it comprises a cylindrical lens holder having a first multicrest helicoid and at least one keyway on an outer periphery of the cylindrical lens holder. The key member comprises a cylindrical part having at least one key for engagement with the keyway at an inner periphery of the cylindrical part of the key member. The helicoid female member comprises a cylindrical part having a second multicrest helicoid that screws together with the first multicrest helicoid, at an inner periphery of the cylindrical part of the helicoid female member. The rotating frame fixes the position of the helicoid female member to the key member in an optical axis direction of the lenses and rotatably supports the helicoid female member about the optical axis;

Preferably, the rotating frame and the key member are engaged by a bayonet mechanism, whereby the position of the helicoid female member is fixed to the key member in the optical axis direction and rotatably supported about the optical axis. Due to this, assembly of the rotating frame and key member is simplified and the efficiency of the assembly process is improved.

Preferably, the bayonet mechanism is comprised of a plurality of first pawls provided at the key member and projecting out radially about the optical axis and a plurality of second pawls provided at the rotating frame and projecting in toward said optical axis to engage with each of the first pawls.

The rotating frame and the helicoid female member may be connected by an annular part perpendicular to the optical axis, and openings of the same shape as the second pawls are provided at positions of the annular part facing the second pawls. This simplifies integral molding of the rotating frame and the helicoid female member.

BRIEF DESCRIPTION OF THE DRAWING

The objects and advantages of the present invention will be better understood from the following description, with reference to the accompanying drawings in which.

DESCRIPTION OF THE PREFERRED EMBODIMENTS

Figure 1:
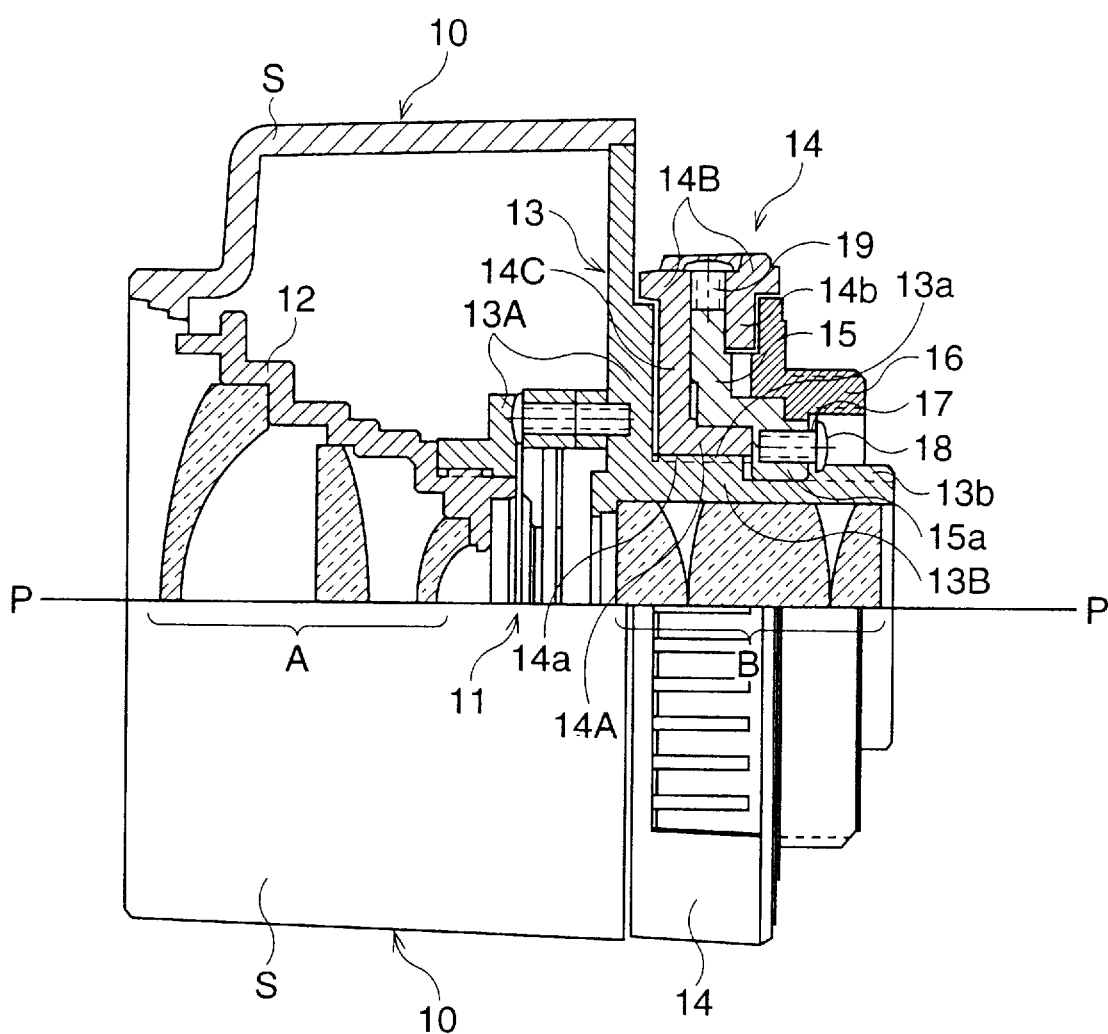
FIG. 1 is a sectional view of a lens barrel of a CCTV camera in an embodiment of the present invention.

The present invention will be described below with reference to embodiments shown in the drawings.

FIG. 1 is a view showing a lens barrel of a CCTV camera in the present embodiment. The top half of the figure shows a cross-section of the lens barrel, while the bottom half shows the outer appearance.

A front lens group A, an iris 11, and a rear lens group B are arranged, in this order from the left, in the lens barrel 10 along the optical axis PP. The front lens group A is held by the front lens group frame 12, while the rear lens group B is held by the rear lens group frame 13. The rear lens group frame 13 is comprised of a cylindrical lens holder 13B, for holding the rear lens group B and having the optical axis PP as its axis, and an iris holder 13A for holding the iris 11 and the front lens group frame 12. The front lens group frame 12, the rear lens group frame 13, and the outer shell S are integral with the lens barrel body.

Figure 2:
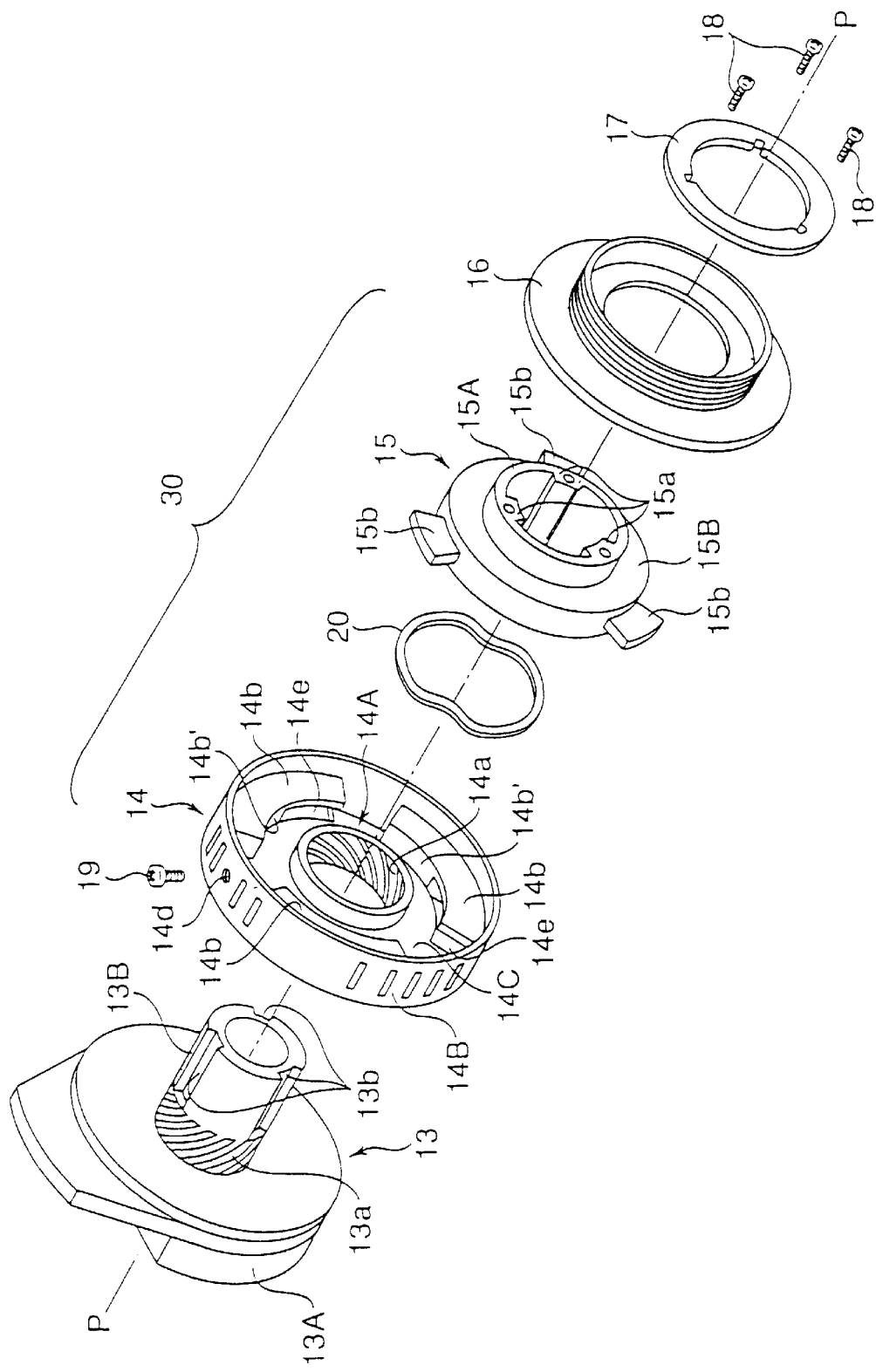
FIG. 2 is an exploded view showing the assembly of the linear-motion helicoid mechanism parts of the embodiment.

A focus ring member 14 and a key member 15 comprise a linear-motion female mechanism part 30 (see FIG. 2). This is engaged with the cylindrical lens holder 13B of the rear lens group frame 13 comprising the linear-motion helicoid male mechanism part to form the linear-motion helicoid mechanism. A mount 16 is attached to the key member 15 by a mount spring (an annular spring plate) 17 and three screws 18 (only one shown). By way of example, the mount 16 is shown as a screw mount. The lens barrel 10 is attached and affixed to the not shown camera body through the mount 16.

Figure 3:
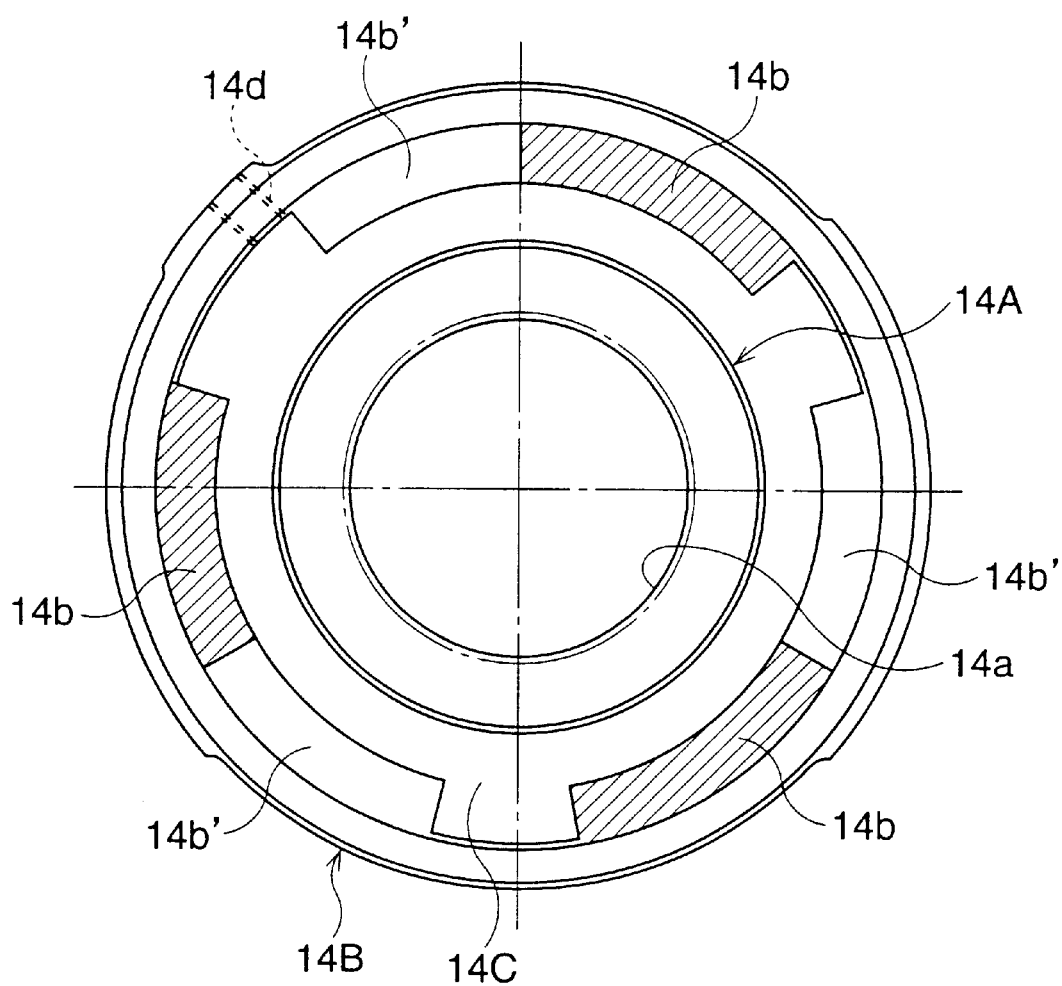
FIG. 3 is a plan view of a focus ring member.
Figure 4:
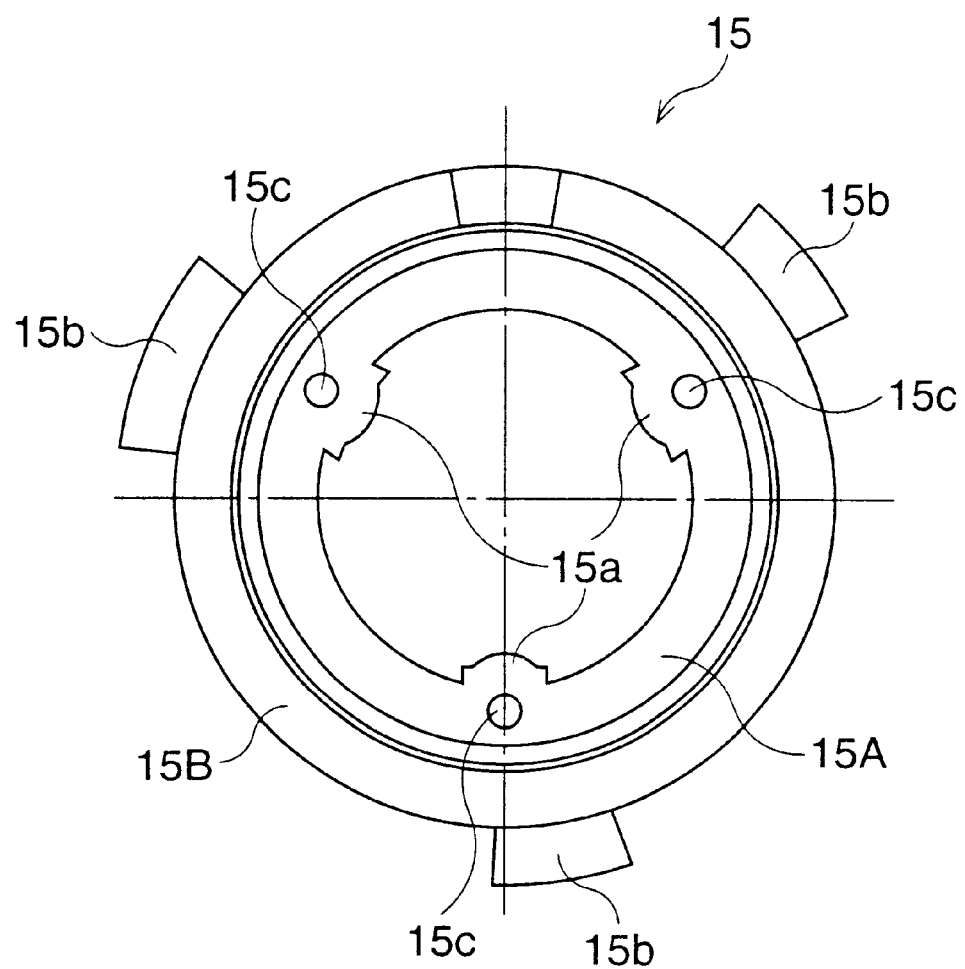
FIG. 4 is a plan view of a key member.

Next, by referring to FIG. 1 to FIG. 4 inclusive, an explanation will be given of the linear-motion helicoid male mechanism part, that is, the lens holder 13B, and the linear-motion helicoid female mechanism part 30. FIG. 2 is an exploded view showing the order of assembly of the rear lens group frame 13 and the linear-motion helicoid female mechanism part 30. FIG. 3 and FIG. 4 are plan views of the focus ring member 14 and the key member 15.

A multicrested helicoid (first multicrest helicoid) 13a is formed on the outer periphery of the cylindrical lens holder 13B, at a part closest to the iris holder 13A (the part to the left in the figure). In part of the outer periphery of the cylindrical lens holder 13B, close to the camera body end of the lens holder 13B (a part to the right in the figure), three keyways 13b extending along the axial direction of the cylinder are formed at substantially equal intervals in the circumferential direction. The focus ring member 14 is comprised of a small diameter cylindrical part (helicoid female member) 14A and a large diameter cylindrical part (rotating frame) 14B, concentrically supported by an annular backplate (annular part) 14c, each part being formed integrally. A multicrest helicoid (second multicrest helicoid) 14a is formed on the inner periphery of the cylindrical part 14A. The multicrest helicoid 14a engages with the multicrest helicoid 13a provided at the lens holder 13B. The outer cylindrical part 14B is manually operated for focusing (focus ring). On the inner periphery of the cylindrical part 14B, three fan-shaped pawls (second pawls) 14b, project in toward the center (optical axis) of the cylinder and extend along the circumferential direction, parallel with and at a predetermined distance to the annular backplate 14C. In FIG. 3, the pawls 14b are shown by hatching. Fan-shaped thick parts 14b are provided on extensions of the pawls 14b in the counterclockwise direction. There is no clearance between the thick parts 14b and the annular backplate 14c as they are formed integrally. The thick parts 14b are parts of the annular backplate 14C projecting out in a fan-shape to the same height as the pawls 14b. Each set, which includes a pawl 14b and a thick part 14b, are integral and form a single fan shaped member.

The key member 15 is comprised of the cylindrical part 15A and the annular plate 15B. Three keys 15a that engage with the three keyways 14a, provided at the lens holder 13B of the rear lens group frame 13, are formed on the inner periphery of the cylindrical part 15A. Three fan-shaped pawls (first pawls) 15b are formed radially along the outer periphery of the annular plate 15B. The three pawls 15b are engaged with the three pawls 14b of the focus ring member 14 by a bayonet mechanism, whereby the focus ring member 14 and the key member 15 are fixed in the direction of the optical axis. Note that the pawls 14b, as explained herein after, can rotate freely in a predetermined arc around the optical axis.

Screw holes 15c are provided at the end positions of the keys 15a of the cylindrical part 15A. The mount 16 is affixed to the key member 15 by the mount spring 17 and the three screws 18 screwed into the screw holes 15c. Note that one of the three keys 15a is different in size to the other keys. For example, the bottom most key 15a in FIG. 4 has a smaller width than the other two keys. The three keyways 13b provided at the lens holder 13B are formed to engage with the keys 15a shown in FIG. 4, so one keyway 13b has a smaller width. Therefore, the lens holder 13B and the key member 14 can only engage at one location. Due to this, positioning of the lens holder 13B and the key member 14 becomes easy.

Figure 5:
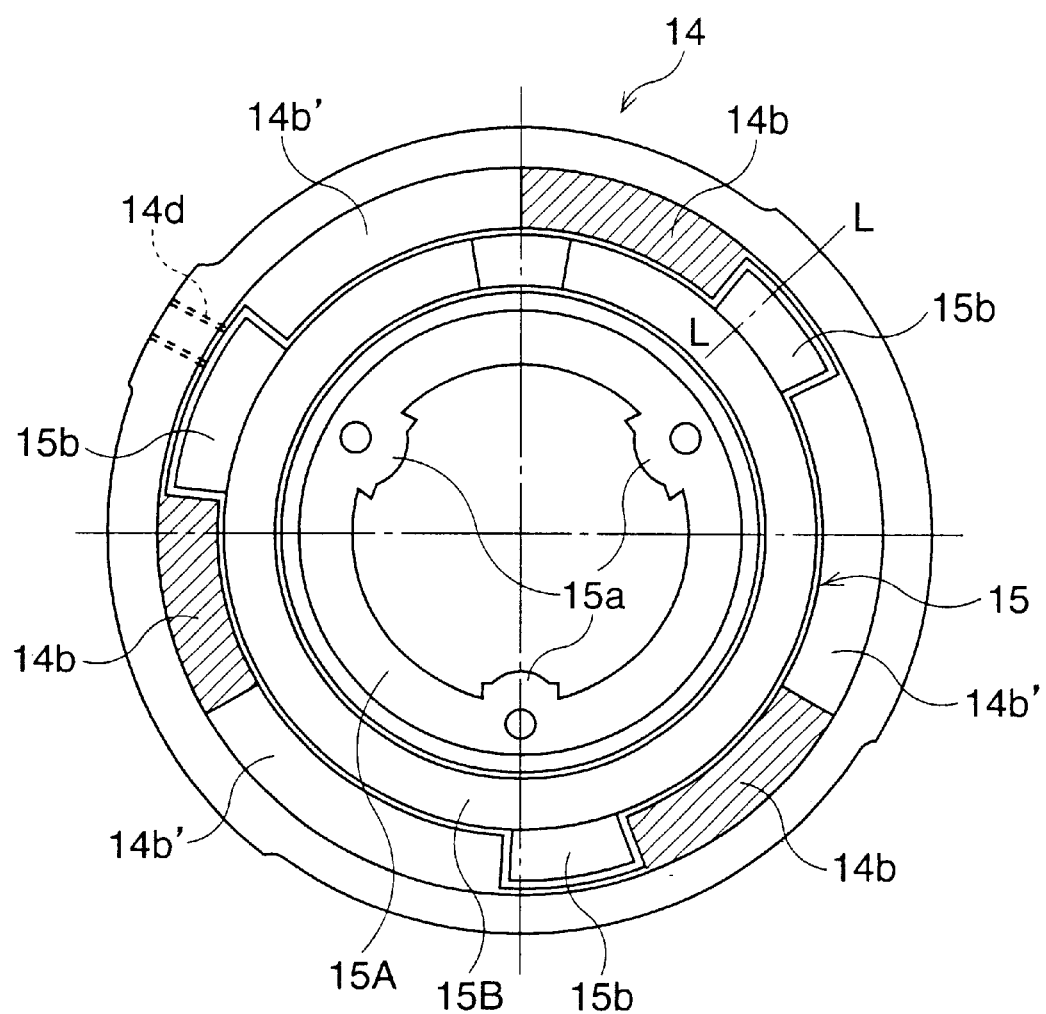
FIG. 5 is a plan view showing a state when the key member is inserted into a bayonet mechanism of the focus ring.
Figure 6:
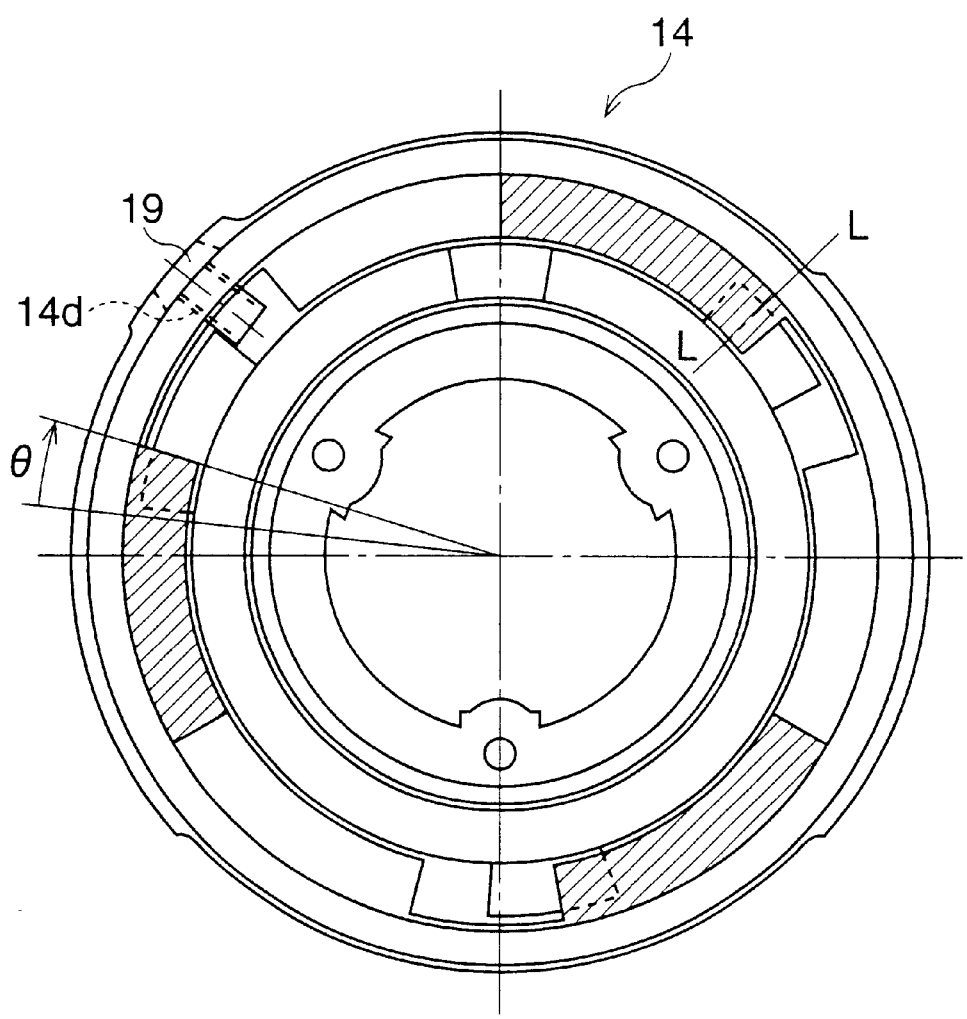
FIG. 6 is a plan view showing a state when the focus ring member is rotated clockwise from the state of FIG. 5 by angle θ.
Figure 7:
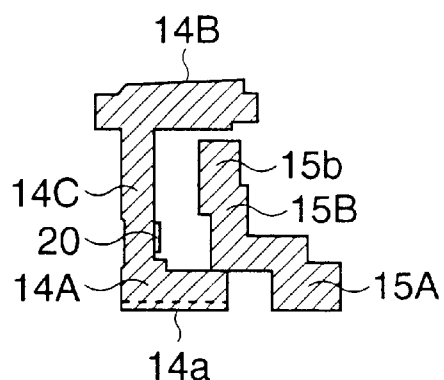
FIG. 7 is a sectional view along line LL of FIG. 5.
Figure 8:
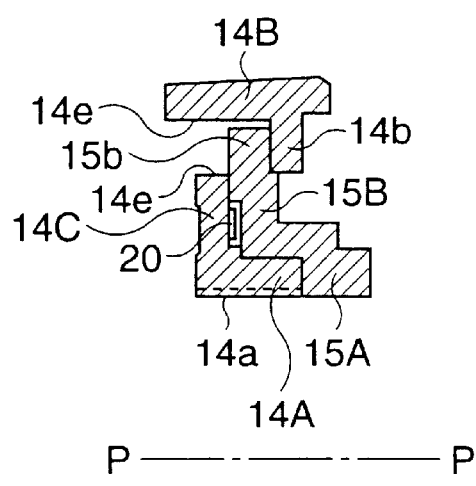
FIG. 8 is a sectional view along line LL of FIG. 6.
Figure 9:
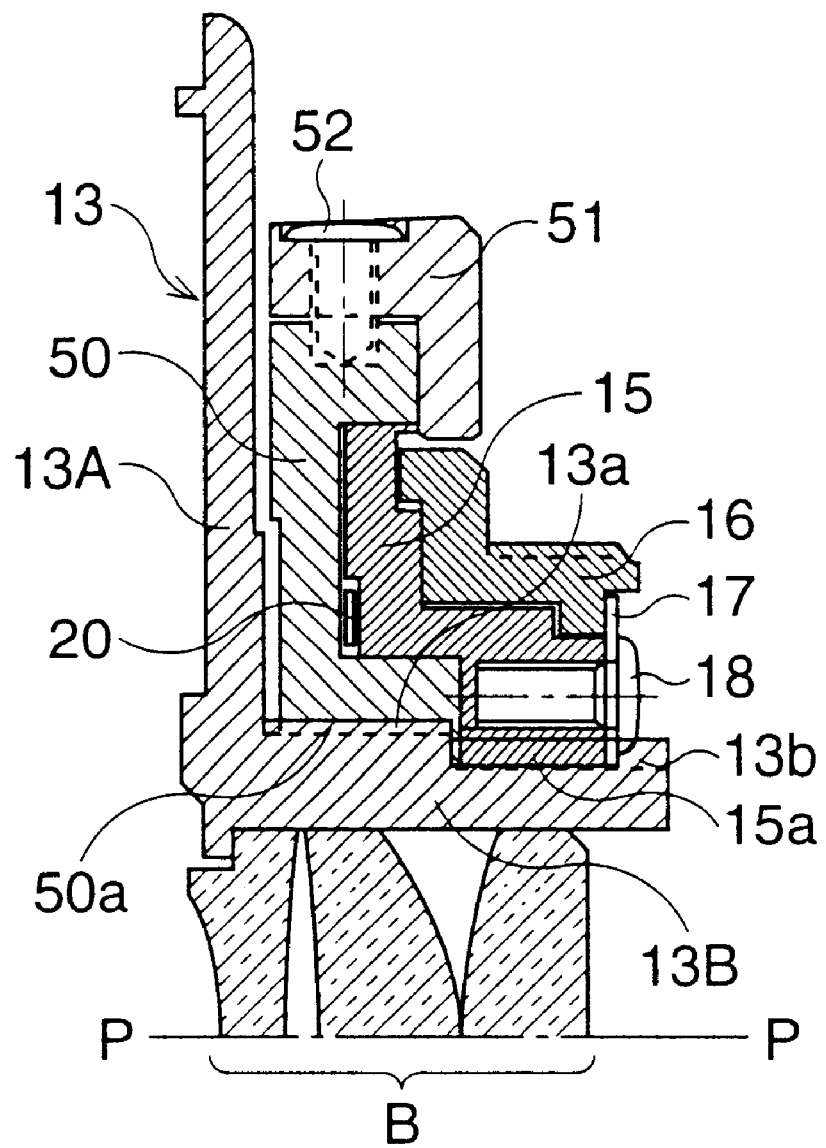
FIG. 9 is a sectional view of a conventional linear-motion helicoid mechanism used for a CCTV camera.

Next, referring to FIG. 2 and FIG. 5 to FIG. 8 inclusive, an explanation will be given of the linear-motion helicoid mechanism of the present embodiment. FIG. 5 and FIG. 6 are plan views showing the state when the pawls 15b of the key member 15 are engaged with the pawls 14b of the focus ring member 14. FIG. 5 shows the state directly after engagement, while FIG. 6 shows the state with the focus ring member 14 rotated clockwise by the angle θ from the state of FIG. 5 and with the screw 19 screwed in the screw hole 14d formed in the cylindrical part 14B, the outer circumference of the focus ring member 14. FIG. 7 and FIG. 8 are sectional views along the lines LL in FIG. 5 and FIG. 6.

In the focus ring member 14, the three fan-shaped parts comprising the pawls 14b and the thick parts 14b are arranged around the inner peripheral surface of the cylindrical part 14B at predetermined intervals. The intervals between the fan-shaped parts correspond to the sizes of the three fan-shaped pawls 15b of the key member 15. One of the three pawls 15b of the key member 15 is different in size to the other two pawls. For example, in FIG. 5, the top left pawl 15b has a longer arc length than the other two pawls 15b. Due to this, the focus ring member 14 and the key member 15 can engage at only one location and positioning becomes easy. That is, the key member 15 and the focus ring member 14 are engaged by positioning the three pawls 15b between the corresponding fan-shaped parts (FIG. 5) and rotating the focus ring member 14 in the clockwise direction (FIG. 6).

As explained above, FIG. 6 shows the screw 19 screwed into the screw hole 14d after the focus ring member 14 is rotated by a predetermined angle (θ). The screw 19 is longer than the thickness of the cylindrical part 14B and therefore projects inward from the inner periphery of the cylindrical part 14B. Due to this the screw 19 functions as a stopper, preventing the focus ring 14 from returning to the position of FIG. 5. As a result, the key member 14 and the focus ring member 14 will not become detached. The focus ring member 14 can rotate about the optical axis PP in the clockwise direction from the position of FIG. 6 until any of the pawls 15b strikes the end of a thick part 14b. Note that in FIG. 6, the parts of the pawls 15b engaging with the pawls 14b are drawn by broken lines.

FIG. 7 is a sectional view along the line LL of FIG. 5. The line PP is the optical axis (cylindrical axis). In FIG. 7, a clearance is provided between the focus ring member 14 and the key member 15. At the time of attachment, the focus ring member 14 and the key member 15 are brought into close contact until the annular plate 15B of the key member 15 and the annular backplate 14C of the focus ring member 14 come into contact. Note that a ring-shaped wave spring 20 is arranged between the annular backplate 14C of the focus ring 14 and the annular plate 15B of the key member 15. The wave spring 20 prevents rattling between the annular backplate 14C of the focus ring member 14 and the annular plate 15B of the key member 15.

FIG. 8 is a sectional view along the line LL in FIG. 6. The annular plate 15B of the key member 15 contacts the annular backplate 14C of the focus ring member 14, while the key pawls 15b engage with the pawls 14b of the focus ring member 14. Further, fan-shaped openings 14e of the same shape as the pawls 14b are formed in the annular backplate 14C of the focus ring member 14 facing the pawls 14b. That is, in FIG. 3, openings 14e are formed at the hatched positions of the annular backplate 14b. Note that the openings 14e are provided to facilitate molding of the focus ring member 14 provided with the pawls 14b.

As described above, according to the present embodiment, a linear-motion helicoid mechanism with a focus ring and a helicoid female member is formed integrally. The helicoid female mechanism parts of a conventional linear-motion helicoid are comprised of three parts: the helicoid female member with the multicrest helicoid, the key member, and the focus ring, but according to the present embodiment, the focus ring and the helicoid female member are formed integrally as the focus ring member, so it is possible to obtain a helicoid female mechanism of a linear-motion helicoid assembly by using only two parts, that is, the focus ring member and the key member, therefore the number of parts can be reduced and the size can be made more compact.

Further, since the focus ring member and the key member are engaged by a bayonet mechanism, assembly can also be performed more simply and easily and the number of screws required for assembly is also reduced. In the conventional configuration, a large number (for example three) of screws were required for attaching the focus ring to the helicoid female member, but in the present embodiment the focus ring member and the key member can be assembled by a single screw 19 used as a stopper. Further, due to the above, the manufacturing cost can also be reduced.

Note that in this embodiment, there were three pawls for the bayonet mechanism, but the number of pawls may be any plural number and is not limited to three. Further, in the present embodiment, only one pawl was made different in size from the other pawls, but all pawls may also be made the same size or all may be made different. Further, in the present embodiment, for the width of the keys (keyways) as well, only one key (keyway) was made different in width from the other keys (keyways), but all may be the same or all may also be different.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2000-247399 (filed on Aug. 17, 2000) which are expressly incorporated herein, by reference, in their entireties.

What is claimed is:

1. A linear-motion helicoid mechanism for a CCTV camera, comprising:

a lens frame for holding lenses, which comprises a cylindrical lens holder having a first multicrest helicoid and at least one keyway on an outer periphery of said cylindrical lens holder;

a key member that comprises a cylindrical part having at least one key for engagement with said keyway at an inner periphery of said cylindrical part of said key member;

a helicoid female member that comprises a cylindrical part having a second multicrest helicoid that screws together with said first multicrest helicoid, at an inner periphery of said cylindrical part of said helicoid female member; and a rotating frame that fixes a position of said helicoid female member to said key member in an optical axis direction of said lenses and rotatably supports said helicoid female member about the optical axis;

wherein said helicoid female member and said rotating member are formed integrally.

2. A mechanism according to claim 1, wherein said rotating frame and said key member are engaged by a bayonet mechanism, whereby said position of said helicoid female member is fixed to said key member in said optical axis direction and supported to be able to rotate about said optical axis.

3. A mechanism according to claim 2, wherein said bayonet mechanism comprises a plurality of first pawls provided at said key member and projecting out radially about the optical axis and a plurality of second pawls provided at said rotating frame and projecting in toward said optical axis to engage with each of said first pawls.

4. A mechanism according to claim 3, wherein said rotating frame and said helicoid female member are connected by an annular part perpendicular to said optical axis and openings of the same shape as said second pawls are provided at positions of said annular part facing said second pawls.

* * * * *